(12) United States Patent
Rowley

(10) Patent No.: US 7,761,405 B2
(45) Date of Patent: Jul. 20, 2010

(54) PER ENTRY CHANGELOG

(75) Inventor: Peter Andrew Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 234 days.

(21) Appl. No.: 11/606,712

(22) Filed: Nov. 29, 2006

(65) Prior Publication Data

US 2008/0126438 A1    May 29, 2008

(51) Int. Cl.
*G06F 17/00*    (2006.01)

(52) U.S. Cl. ........................................ 707/600

(58) Field of Classification Search ............... 707/1–10, 707/100–102
See application file for complete search history.

(56) References Cited

U.S. PATENT DOCUMENTS

| | | | |
|---|---|---|---|
| 6,768,988 B2 | 7/2004 | Boreham et al. | |
| 6,785,686 B2 | 8/2004 | Boreham et al. | |
| 7,016,893 B2 | 3/2006 | Boreham et al. | |
| 7,016,907 B2 | 3/2006 | Boreham et al. | |
| 7,020,662 B2 | 3/2006 | Boreham et al. | |
| 7,130,839 B2 * | 10/2006 | Boreham et al. | 707/3 |
| 2003/0074237 A1 * | 4/2003 | Sechrist et al. | 705/7 |
| 2003/0083909 A1 * | 5/2003 | Hoffman et al. | 705/7 |
| 2005/0210263 A1 * | 9/2005 | Levas et al. | 713/182 |
| 2005/0273516 A1 * | 12/2005 | Patrick et al. | 709/238 |
| 2005/0273518 A1 * | 12/2005 | Patrick et al. | 709/238 |
| 2006/0036463 A1 * | 2/2006 | Patrick et al. | 705/1 |
| 2006/0195575 A1 * | 8/2006 | Delany et al. | 709/225 |
| 2008/0077462 A1 * | 3/2008 | Patel et al. | 705/7 |

* cited by examiner

*Primary Examiner*—Diane Mizrahi
(74) *Attorney, Agent, or Firm*—Blakely, Sokoloff, Taylor & Zafman LLP

(57) ABSTRACT

A method and apparatus for managing log per entry in a directory server is described. In one embodiment, the directory server receives a request to operate on an entry in the directory server. The directory server operates on the entry. The information of the operation on the entry is stored in a log attribute of the entry.

20 Claims, 5 Drawing Sheets

PER ENTRY CHANGELOG

TECHNICAL FIELD

Embodiments of the present invention relate to a Lightweight Directory Access Protocol (LDAP), and more specifically to per entry change log.

BACKGROUND

Light Weight Directory Access Protocol (LDAP) has become very popular due to its efficient and fast data access. A large number of applications/services are currently being developed which use an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes, and each entry has an objectClass attribute containing named classes defined in the schema. The objectClass attribute may be multivalued, and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes), and the obligation of containing another set of attributes (mandatory or required attributes). For example, an entry representing a person might belong to the class "person". Membership in the "person" class would require the entry to contain the "sn" and "cn" attributes, and allow the entry also to contain "userPassword", "telephoneNumber", and other attributes.

The LDAP directory supports an audit log that stores changes made to the entire directory. A special script needs to be written to parse the entire general audit log of the LDAP directory to obtain information of any change pertaining to an entry. Operating such a script on the entire LDAP directory presents many inefficiencies and would also require local access of the LDAP directory server.

BRIEF DESCRIPTION OF THE DRAWINGS

The present invention is illustrated by way of example, and not by way of limitation, in the figures of the accompanying drawings and in which.

DETAILED DESCRIPTION

Figure 1:
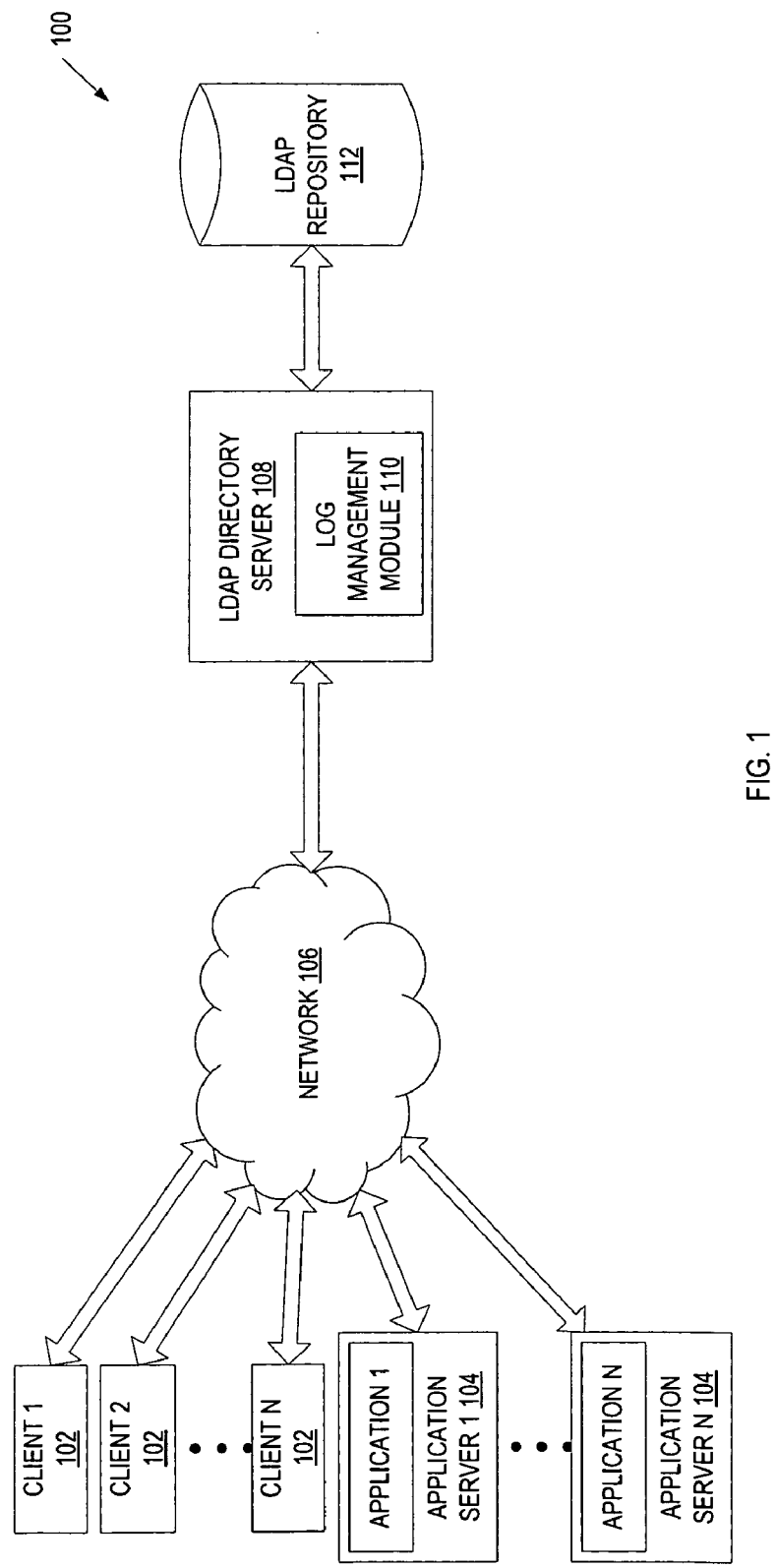
FIG. 1 illustrates a network architecture in which embodiments of the present invention may be implemented.

Described herein is a method and apparatus for managing a change log per entry in a directory server is described. In one embodiment, the directory server receives a request to operate on an entry in the directory server. The directory server operates on the entry. The information of the operation on the entry is stored in a log attribute of the entry.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices.

FIG. 1 illustrates an exemplary network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs), etc.

The clients 102 are coupled to the LDAP directory server 108 via the network 106, which may be a public network (e.g., Internet) or a private network (e.g., Ethernet or a local area Network (LAN)). The LDAP directory server 108 may contain a server front-end responsible for network communications, plugins for server functions (such as access control and replication), a basic directory tree containing server-related data, and a database back-end plugin responsible for managing the storage and retrieval of LDAP repository data.

In one embodiment, the clients 102 communicate with the LDAP directory server 108 via a web server (not shown). For example, the clients 102 may host web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communications with the LDAP directory server 112. Similarly to the clients 102, the application servers 104 may communicate with the LDAP directory server 112 directly or via a web server.

The LDAP repository 112 may be part of the LDAP directory server 108, or it may reside externally (e.g., on a database server). Server 108 may be a single server or a cluster of servers. The LDAP repository 112 may contain a tree of data entries. The structure of the entries may be specified in the definition of the LDAP repository 112. The definition of the LDAP repository 112 may be represented as a schema, a table or some other data structure, and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class an entry belongs to defines what kind of object the entry may represent (e.g., a person, organization or domain).

In one embodiment, the LDAP directory server 108 includes a log management module 110 that may be part of the LDAP directory server 108 or some other device and/or program, or be an independent module implemented in hardware, software or a combination thereof.

In one embodiment, the log management module 110 manages the entry logs formed in the LDAP directory server 108 based on values of log attribute of each entry in the LDAP directory server 108. The log attribute stores changes made to the entry. The operation and management of a log entry is further described in FIG. 2.

In accordance with one embodiment, the log management module 110 receives request to operate on an entry in the LDAP directory server 108. The LDAP directory server 108 operates on the entry. Information pertaining to the operation is stored or added to a log attribute of the entry in the LDAP directory server 108.

Figure 2:
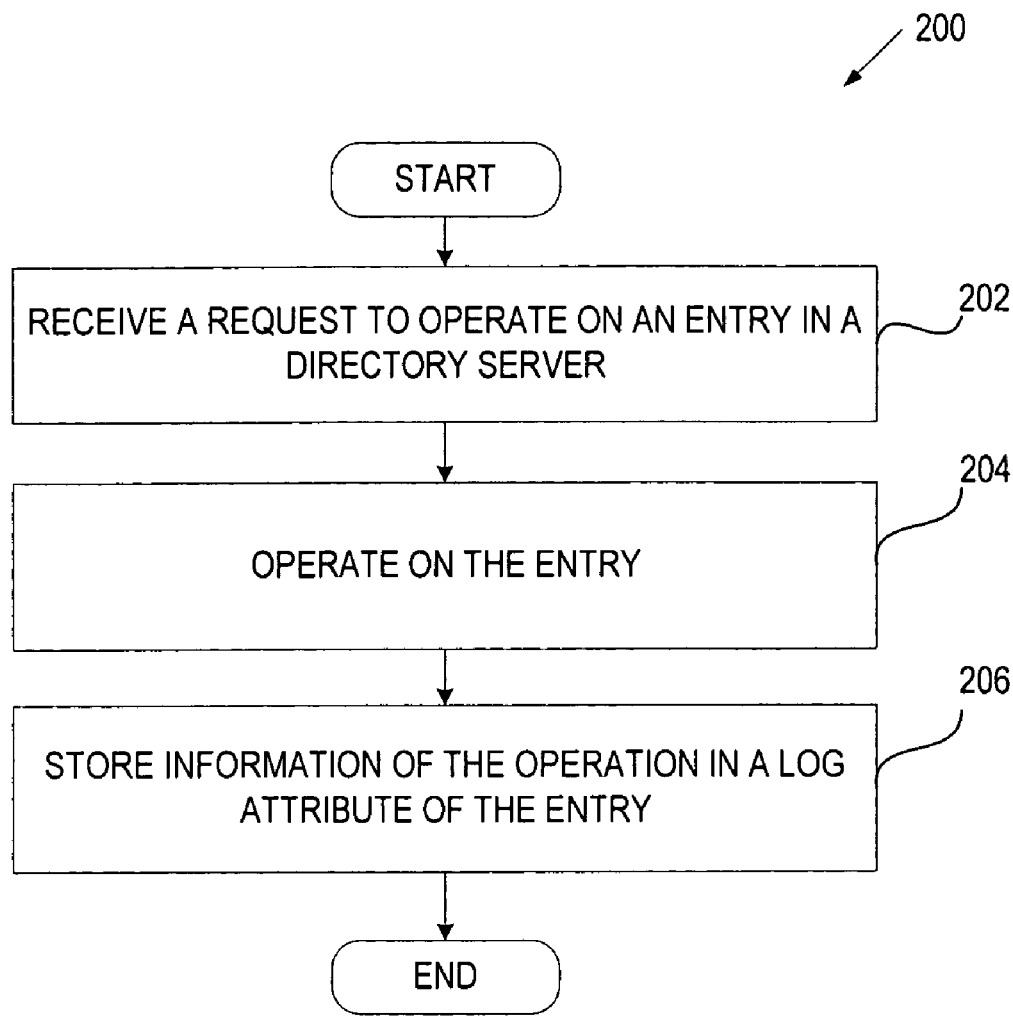
FIG. 2 illustrates a flow diagram of one embodiment of a method for managing logs in a directory server.

FIG. 2 illustrates a flow diagram of one embodiment of a method 200 for managing a change log per entry in a LDAP directory server. The method may be performed by processing logic that may comprise hardware (e.g., circuitry, dedicated logic, programmable logic, microcode, etc.), software (such as instructions run on a processing device), or a combination thereof. In one embodiment, method 200 is performed by the log management module 110 of the LDAP directory server 108 of FIG. 1.

Referring to FIG. 2, at block 202, a processing logic of the LDAP directory server 108 receives a request to operated on an entry in the LDAP repository 112. For example, the request may be any request to operate a change on the entry, such as adding, deleting, editing. The request may be, for example, to change the last name of an employee entry, to remove a former employee entry, to add a new employee entry.

At block 204, processing logic operates on the entry in response to the request received in block 202.

At block 206, processing logic stores information of the operation in a log attribute of the entry. In accordance with one embodiment, the log attribute may be for example, "entryChangeLog". Information regarding the operation on the entry is stored or added to the value of the entry. For example, the information of the operation may include among others, a time of the operation, a method of the operation, an identity of the origin of the request, a value of an attribute of the entry prior to the operation, and a value of an attribute of the entry after the operation. Those of ordinary skills in the art will recognize there are other types of operation and that the above list of type of information is for illustration purposes.

In accordance with one embodiment, the information of the operation may be stored in the change log of the entry for a predefined period of time. For example, the history of the changes in the change log may be kept for a month, a year or any other period of time.

In accordance with one embodiment, the change log may store a limited number of operations on the entry. For example, the change log may store the last ten operations on the entry. The number of operations on the entry stored in the change log may be set to any number.

In accordance with one embodiment, the change log may be configured to delete one or more values of the log attribute in response to a predefined operation on the entry. For example, old values of the log attribute may be deleted when a particular operation on the entry in requested.

Those of ordinary skills in the art will recognize that other limits may be set on the change log independently of the main audit log. The above operational attribute (e.g. EntryChangeLog) allows retrieving a history of changes to the entry without performing a script to parse a main audit log of the directory server.

In accordance with another embodiment, the values in the log attribute may be sorted in a chronological order. For example, the values of the log attribute of an entry may be listed from a most recent change to the oldest change, or in any other preset or predefined order.

Figure 3:
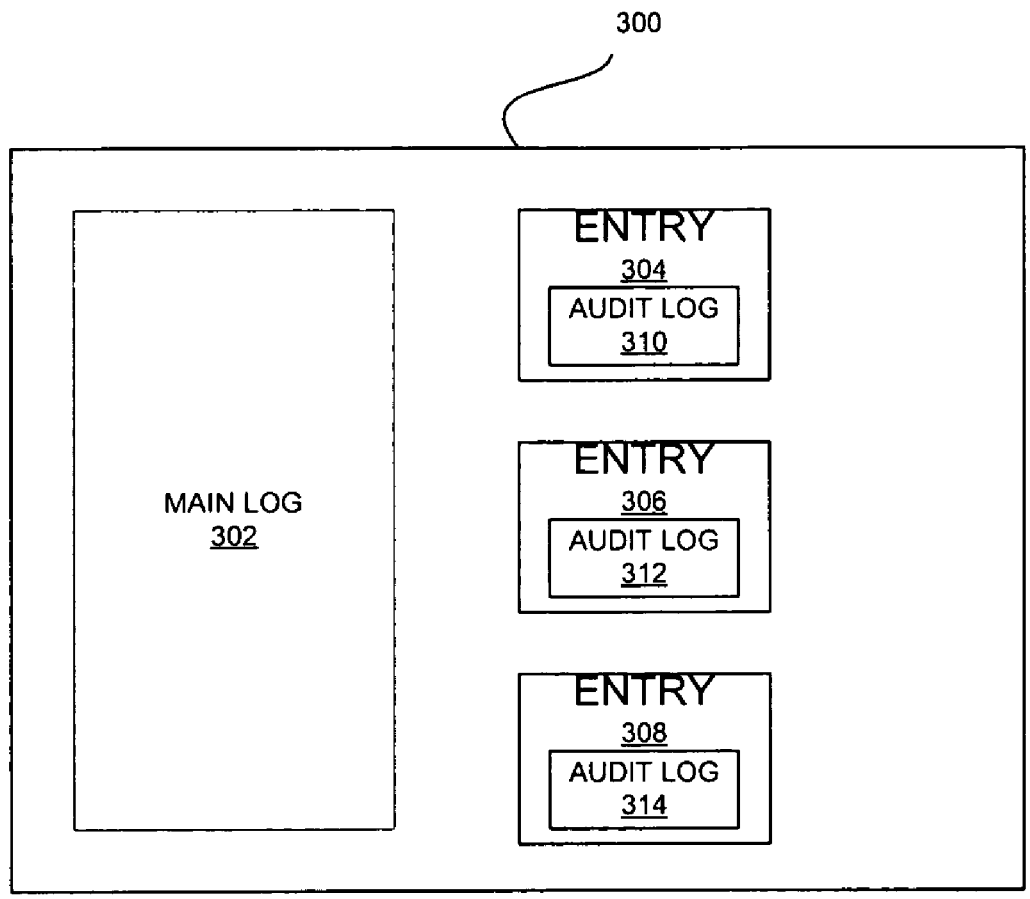
FIG. 3 illustrates a block diagram of a group of a directory server in accordance with one embodiment.

FIG. 3 illustrates a block diagram of one embodiment of a directory server 300. A conventional main log 302 records all changes made to the directory server 300. Entries 304, 306, and 308 are stored in the directory server 300. Each entry may include its own audit log. Entries 304, 306, and 308 respectively include audit log 310, 312, and 314. The audit log 310, 312, and 314 may be implemented with the previously described operational attribute: entryChangeLog.

Figure 4:
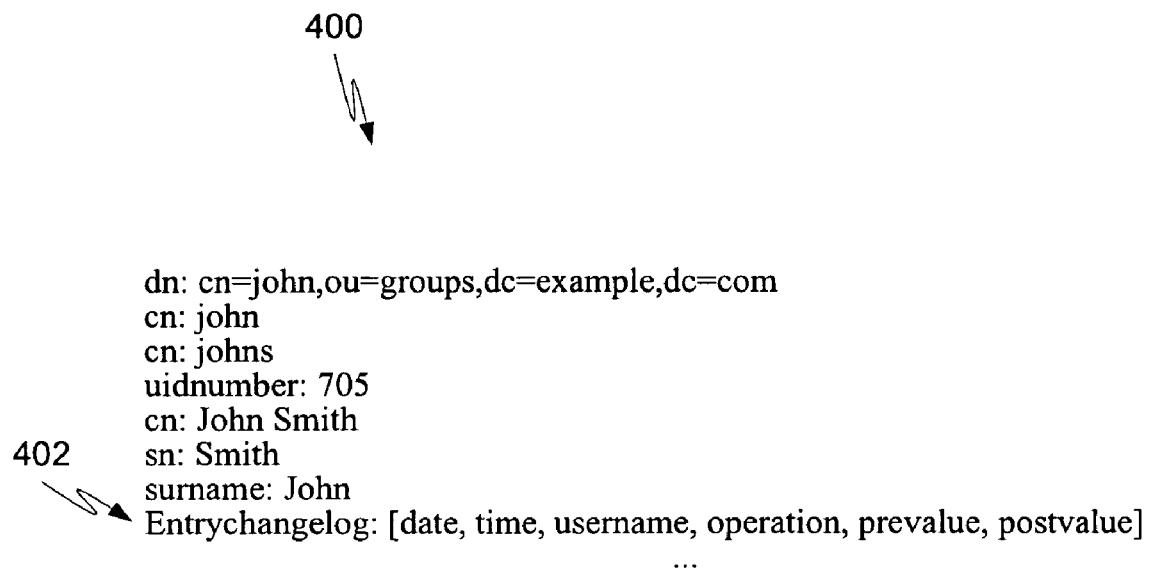
FIG. 4 illustrates an example of a changelog of an entry in accordance with one embodiment.

FIG. 4 illustrates an example of a LDIF fragment 400 that shows the operational log attribute 402 called "Entry-ChangeLog" of an entry. Each entry thus include a log attribute that records the changes to the particular entry. The value of the log attribute may include but is not limited to the date, time, the user who requested the change, the type of operation, the value of an attribute of the entry prior to the change, the value of an attribute of the entry after the change.

Figure 5:
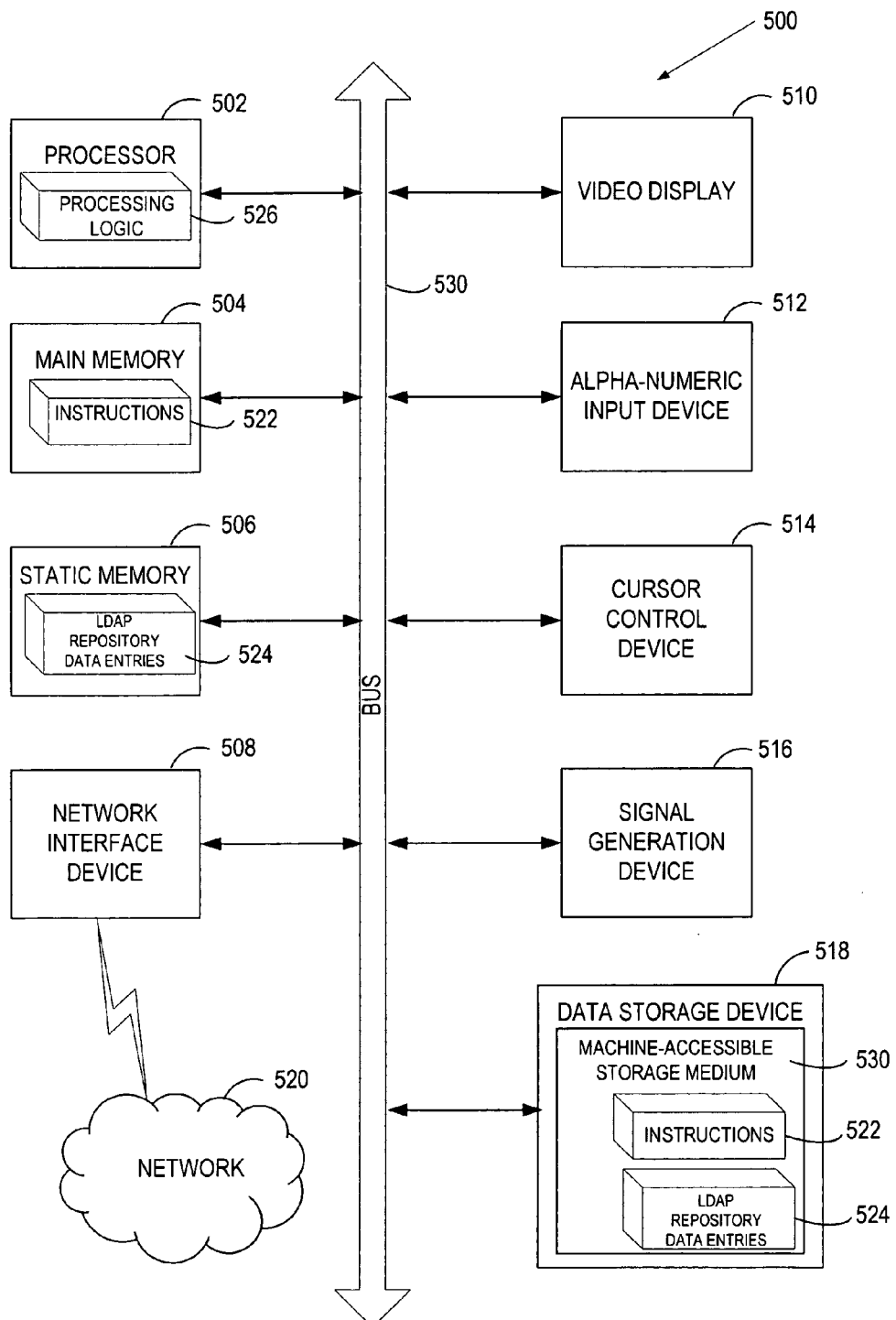
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store LDAP repository data entries 524. LDAP repository data entries 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine accessible storage medium" shall accordingly be taken to include, but not be limited to, solid-state memories, and optical and magnetic media.

Thus, a method and apparatus for dynamically managing groups have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for managing a directory server, the method comprising:
receiving, by a log management module in the directory server, a request to operate on an entry in the directory server;
operating on the entry by a log management module in the directory server;
storing, by a log management module in the directory server, information of the operation in a single log attribute of the entry, wherein the information of the operation further comprises a time of the operation, a method of the operation, an identity of the origin of the request, a value of an attribute of the entry prior to the operation, a value of an attribute of the entry after the operation, and a history of all prior values of the attributes of the entry; and
retrieving, by a processor of the directory server, a history of changes to the entry without performing a script to parse a main audit log of the directory server.

2. The method of claim 1 wherein the operation comprises a change to the entry.

3. The method of claim 1 wherein the directory server comprises a Lightweight Directory Access Protocol (LDAP) repository.

4. The method of claim 1 wherein the log attribute comprises an entryChangeLog attribute.

5. The method of claim 1 wherein the log attribute is configured to store the information of the operation for a limited amount of time.

6. The method of claim 1 wherein the log attribute is configured to store the information of the last predefined numbers of operations on the entry.

7. The method of claim 1 wherein one or more values of the log attribute are deleted when the number of values in the log attribute exceeds a predefined limit.

8. A server comprising:
- a processor to retrieve a history of changes to an entry in a Lightweight Directory Access Protocol (LDAP) repository without performing a script to parse a main audit log of the server;
- a storage coupled to processor, the storage comprising the LDAP repository; and
- a log management module coupled to the LDAP repository, the log management module configured to store information of an operation in a single log attribute of the entry in the LDAP repository, wherein the information of the operation further comprises a time of the operation, a method of the operation, an identity of the origin of the request, a value of an attribute of the entry prior to the operation, a value of an attribute of the entry after the operation, and a history of all prior values of the attributes of the entry.

9. The server of claim 8 wherein the operation comprises a change to the entry.

10. The server of claim 9 wherein the log attribute comprises an entryChangeLog attribute.

11. The server of claim 9 wherein the log attribute is configured to store the information of the operation for a limited amount of time.

12. The server of claim 9 wherein one or more values of the log attribute are deleted when the number of values in the log attribute exceeds a predefined limit.

13. The server of claim 9 wherein the log attribute is configured to store the information of the last predefined numbers of operations on the entry.

14. A non-transitory computer-accessible storage medium including data that, when accessed by a computer system, cause the computer system to perform a method comprising:
- receiving a request to operate on an entry in a directory server;
- operating on the entry; and
- storing information of the operation in a single log attribute of the entry,
  - wherein the information of the operation further comprises a time of the operation, a method of the operation, an identity of the origin of the request, a value of an attribute of the entry prior to the operation, a value of an attribute of the entry after the operation, and a history of all prior values of the attributes of the entry; and
- retrieving, by a processor of the directory server, a history of changes to the entry without performing a script to parse a main audit log of the directory server.

15. The non-transitory computer-accessible storage medium of claim 14 wherein the operation comprises a change to the entry.

16. The non-transitory computer-accessible storage medium of claim 14 wherein the directory server comprises a Lightweight Directory Access Protocol (LDAP) repository.

17. The non-transitory computer-accessible storage medium of claim 14 wherein the log attribute comprises an entryChangeLog attribute.

18. The non-transitory computer-accessible storage medium of claim 14 wherein the log attribute is configured to store the information of the operation for a limited amount of time.

19. The non-transitory computer-accessible storage medium of claim 14 wherein the log attribute is configured to store the information of the last predefined numbers of operations on the entry.

20. The non-transitory computer-accessible storage medium of claim 14 wherein one or more values of the log attribute are deleted when the number of values in the log attribute exceeds a predefined limit.

* * * * *